3,317,422
EXTRACTION OF AROMATIC HYDROCARBONS FROM HYDROCARBON MIXTURES
Alvin L. Benham, Littleton, Colo., assignor to Marathon Oil Company, Findlay, Ohio, a corporation of Ohio
Filed Feb. 10, 1964, Ser. No. 343,859
8 Claims. (Cl. 208—327)

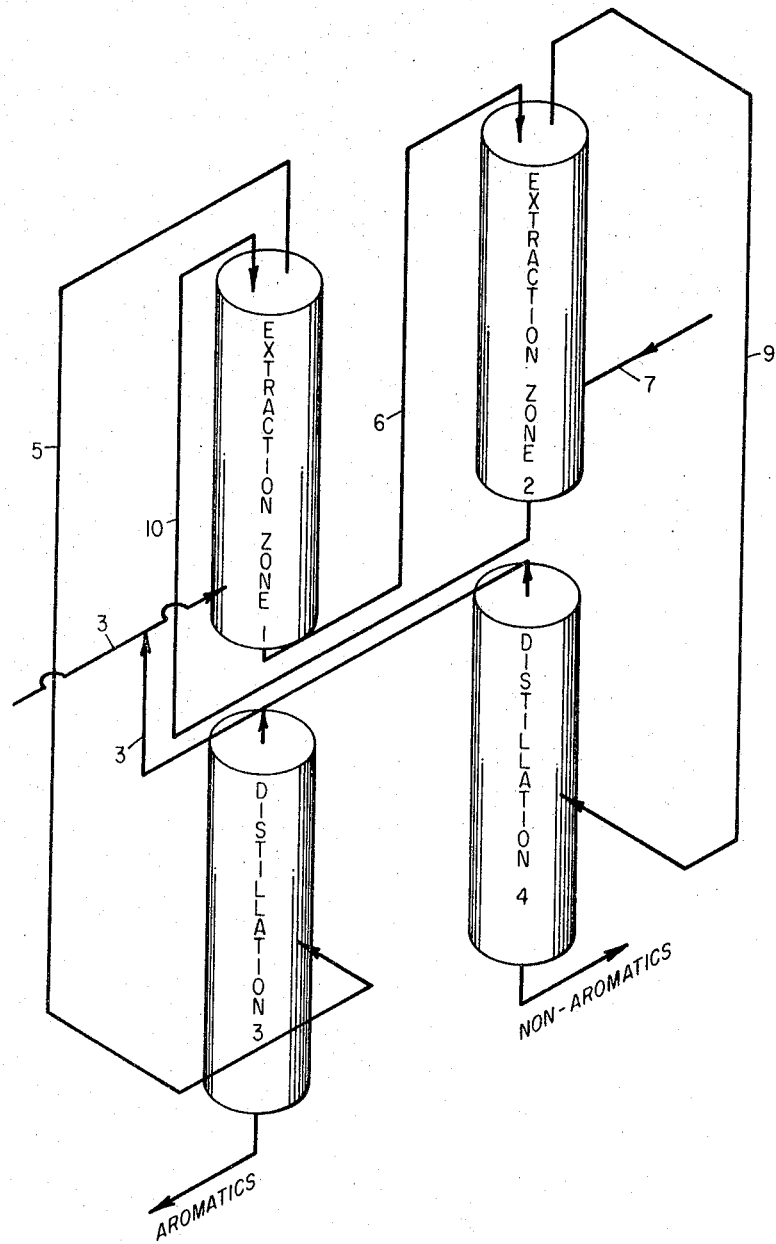

My invention relates to multiple extraction of liquid mixtures with a common selective solvent, and more particularly to the use of dual extraction zones in which two liquids are extracted with the same selective solvent.

Recycle extract dual extraction employs two extraction zones using the same selective solvent to separate two different components. The extract from one zone is recycled to the other zone as a solvent. This type of process is described in U.S. Patents 2,201,549 and 2,201,550. To the applicant's knowledge few processes of this type have been commercially operable due to the difficulty of controlling certain variables in the process. An experimental operation is described in an article by G. S. Somekh, Hydrocarbon Processing and Petroleum Refiner, vol. 42, No. 10, 1963, pp. 157–64.

Variables that must be accurately controlled are extraction zone temperature, composition and selectivity of the dual solvent, ratio of extract recycled to feed, ratio of the separate feed materials and proper feed materials.

Various solvents have been described as useful in such extractions, including ethylene glycol, propylene, $SO_2$, furfural, cresylic acid, $\beta,\beta'$-dichloroethyl ether, quinoline, phenol, and nitrobenzene. Water is sometimes used to increase the selectivity of a particular solvent. The choice of the particular solvent may be the difference between success and failure in finding the optimum conditions. Some solvents do not work satisfactorily in this type of extraction process; for example, aqueous furfural, aqueous phenol, and acetonitrile. I have found that a one-phase mixture of furfural, furfuryl alcohol, and water is a very good solvent for my process (see co-pending application No. 82,433 by C. J. Norton and F. H. Poettmann, filed Jan. 13, 1961, now Patent 3,168,463, describing this solvent system). This solvent system is utilized to separate aromatic compounds mixed with other types of hydrocarbons. A 5% to 15% by weight portion of water mixed with 35% to 45% furfural and 45% to 65% furfuryl alcohol is preferred, and a 10% portion of water with a 36% portion of furfural, and a 54% portion of furfuryl alcohol is optimum.

I have now invented a process wherein two extraction zones are used to extract aromatic compounds from mixtures with nonaromatic compounds with a one-phase mixture of furfural, furfuryl alcohol, and water as a solvent and light catalytic cycle oil and displacer oil as feeds for the respective extraction zones.

Cycle oil, sometimes called light catalytic cycle oil, is about 204° C. to 316° C. distillation fraction produced from the catalytic cracking of petroleum. Since petroleum varies in its composition, no one set of characteristics will describe the properties of cycle oil. W. L. Nelson, "Petroleum Refining and Engineering," 3rd edition, McGraw-Hill Company, Inc. (1949), 830 pages, describes on page 674 some general characteristics of cycle oil. These are gravity, 20 to 30; characterization factor, 10.6 to 11.6 or lower; boiling range, 204° C. to 343° C. Brown et al., Cycle Stocks From Catalytic Cracking, Industrial and Engineering Chemistry, vol. 38, p. 136 (1946), on page 137 and following gave the characteristics of some cycle oils from different petroleum bases. One such oil had the following characteristics: gravity, 27.2; boiling range, 260° C. to 371° C.; color (Saybolt) 5 Robinson; aniline point, 69.3° C.; refractive index, $N_D^{30}$ 1.5051; and aromatic rings, weight percent, 22%.

My displacer oil is a mixture of nonaromatic compounds, such as heavy naphtha, and 10% to 50% xylenes. About 25% xylenes gives optimum extraction of the desired compounds. The boiling range of the light displacer oil should be below that of the cycle oil. For optimum results the boiling range should be at least 56° C. lower than the cycle oil. Apparently, only polyalkyl aromatic compounds can be mixed with nonaromatic compounds. To form a displacer oil feed in my process, benzene and toluene are not feasible substitutes for xylene.

Generally, my invention comprises the extraction of aromatic and nonaromatic components of cycle oil with a solvent comprised of a one-phase solution of furfural, furfuryl alcohol, and water used in extraction zones 1 and 2.

The drawing shows the flow diagram of the process. In the process in the drawing, light displacer oil is fed into extraction zone 1 through line 3. A make-up of displacer oil and solvent is mixed with the recycle solvent and displacer oil from distillation zones 3 and 4 through line 3. Raffinate comprised of solvent, constituents of the displacer oil, some aliphatic compounds, and a large amount of aromatics is passed through line 5 to distillation zone 3 where an alkylnaphthalene-rich aromatic stream is separated from the displacer oil and solvent constituents. Displacer oil and solvent are recycled for further use. An extract comprised of solvent, xylene, and small amounts of impurities is passed through line 6 to extraction zone 2. Cycle oil is fed into extraction zone 2 by line 7. Raffinate comprised of solvent, displacer oil constituents, some aromatic compounds and a great deal of aliphatic compounds is passed to distillation zone 4 through line 9. A nonaromatic-rich stream is recovered, and the remaining distilled portion is recycled to extraction zone 1 by line 3. The extract from extraction zone 2, which is a mixture of solvent, xylene and some aromatic and nonaromatic constituents, is recycled through line 10 for use in extraction zone 1.

The following example more fully explains my invention.

Example I

In the drawing, extraction zones 1 and 2 are filled with a mixture of furfural, furfuryl alcohol, and water. Displacer oil, comprising about 75% naphtha and about 25% xylene by weight, is fed into extraction zone 1 at 16,830 lbs./hr. Solvent is also fed into extraction zone 1 as a single phase at a rate of 1017 lbs./hr. furfural, 1524 lbs./hr. furfuryl alcohol, and 283 lbs./hr. water. From the top of the first extraction zone a raffinate mixture of about 6.8% by weight of solvent, about 47.3% naphtha, about 12.8% xylene, about 8.1% non-naphthalene compounds, and about 24.9% naphthalene compounds is taken off for separation by distillation. The extract is fed into extraction zone 2. The extract comprises about 32,259 lbs./hr. of water, furfural, and furfuryl alcohol; 5227 lbs./hr. of xylene and naphtha; about 300 lbs./hr. non-naphthalene compounds; and about 594 lbs./hr. aromatic components. Cycle oil is introduced into extraction zone 2 at 19,800 lbs./hr. The temperature of both extraction zones is maintained at about 110° F. A recycle from extraction zone 2 to extraction zone 1 contains solvent at 40,763 lbs./hr., nonaromatic compounds at 1830 lbs./hr., and aromatic compounds at 5437 lbs./hr. The raffinate from extraction zone 2 is distilled to separate heavy aliphatics and solvent. The raffinate contains about 1498 lbs./hr. solvent, 5227 lbs./hr. displacer oil, 5710 lbs./hr. naphthalene compounds and 7715 lbs./hr. non-naphthalene constituents. The ratio of extraction recycle to cycle oil can range from 2.0 to 3.0 lbs./lb., the optimum ratio being about 2.5 lbs. extraction recycle to 1 lb. of cycle oil. The extraction zone temperature can range from 40.8° C. to 45.8° C.; the optimum temperature is about 43° C. The ratio of light displacer oil to light cycle oil ranges from 0.50 to 1.50 lbs./lb.; the optimum ratio is about 1.0 lb./lb.

Now having described my invention, what I claim is:

1. In a process using an intimate, 1-phase solution of furfural, furfuryl alcohol and water as a solvent for the extraction of heavy aromatic and heavy aliphatics, the steps comprising in a closed loop the contacting of a displacer oil comprising a mixture of aromatic-nonaromatic hydrocarbons containing 10% to 50% lower alkyl poly substituted aromatic compounds with a solvent comprising an intimate, 1-phase solution of 35% to 45% furfural, 45% to 65% furfuryl alcohol, and 5% to 15% by weight of water in a first extraction zone, removing a first extract mixture from said first extraction zone to a second extraction zone, removing from said first extraction zone a raffinate, introducing into the second extraction zone a cycle oil having a boiling point higher than that of said displacer oil, removing from second extraction zone a second extract mixture, passing the second extract mixture to the first extraction zone, removing from said second extraction zone a raffinate, and distilling each of said raffinates to recover said heavy aromatics and heavy aliphatics.

2. The process of claim 1 wherein the displacer oil is heavy naphtha, and 10% to 50% xylene.

3. The process of claim 1 wherein the displacer oil is comprised of heavy naphtha and 25% xylene.

4. The process of claim 1 wherein the cycle oil is comprised of the 204° C. to 271° C. distillation fraction produced from the catalytic cracking of petroleum.

5. The process of claim 1 wherein the ratio of displacer oil to cycle oil is about 0.50 to 1.50 lbs. to 1 lb., the temperature of extraction zones 1 and 2 is about 40.8° to 45.8° C., and the preferred ratio of extraction recycle from the second extraction zone to the first to cycle oil is 2.0 to 3.0 lbs. to 1 lb.

6. The process of claim 5 wherein the displacer oil is comprised of heavy naphtha and 25% xylene.

7. The process of claim 1 wherein the ratio of displacer oil to cycle oil is about 1.0 lb. to 1 lb., the temperature of extraction zones 1 and 2 is about 43° C., ratio of extraction recycle from the second extraction zone to the first to cycle oil is about 2.5 lbs./lb., and the solvent has a concentration of about 10% $H_2O$, by weight, 36% furfural and 54% furfuryl alcohol.

8. The process of claim 7 wherein the displacer oil is comprised of heavy naphtha and 25% xylene.

References Cited by the Examiner

UNITED STATES PATENTS 3,168,463   2/1965   Norton et al. _____ 208—327

OTHER REFERENCES

Somekh: "Hydrocarbon Processing and Petroleum Refiner," vol. 42, No. 10, October 1963, pp. 157–164.

DELBERT E. GANTZ, *Primary Examiner.*

HERBERT LEVINE, *Examiner.*

C. E. SPRESSER, JR., *Assistant Examiner.*

UNITED STATES PATENT OFFICE

CERTIFICATE OF CORRECTION

Patent No. 3,317,422                              May 2, 1967

Alvin L. Benham

It is hereby certified that error appears in the above numbered patent requiring correction and that the said Letters Patent should read as corrected below.

Column 3, line 31, for "271° C." read -- 316° C. --

Signed and sealed this 1st day of October 1968.

(SEAL)
Attest:

Edward M. Fletcher, Jr.                          EDWARD J. BRENNER

Attesting Officer                                  Commissioner of Patents